United States Patent
Conus

(10) Patent No.: US 11,490,225 B2
(45) Date of Patent: Nov. 1, 2022

(54) AUTOMATED SURVEILLANCE SYSTEM

(71) Applicant: NAGRAVISION SA, Cheseaux-sur-Lausanne (CH)

(72) Inventor: Joël M. Conus, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 115 days.

(21) Appl. No.: 16/978,900

(22) PCT Filed: Mar. 5, 2019

(86) PCT No.: PCT/EP2019/055431
§ 371 (c)(1),
(2) Date: Jan. 11, 2021

(87) PCT Pub. No.: WO2019/170664
PCT Pub. Date: Sep. 12, 2019

(65) Prior Publication Data
US 2021/0051443 A1    Feb. 18, 2021

(30) Foreign Application Priority Data
Mar. 7, 2018 (EP) .................................... 18160578

(51) Int. Cl.
*H04W 4/029* (2018.01)
*H04B 17/318* (2015.01)
*H04W 12/12* (2021.01)
*H04W 16/14* (2009.01)
*H04W 12/63* (2021.01)

(52) U.S. Cl.
CPC .......... *H04W 4/029* (2018.02); *H04B 17/318* (2015.01); *H04W 12/12* (2013.01); *H04W 16/14* (2013.01); *H04W 12/63* (2021.01)

(58) Field of Classification Search
CPC ..... H04W 4/029; H04W 12/12; H04W 16/14; H04B 17/318
USPC ....................................................... 455/456.3
See application file for complete search history.

(56) References Cited

U.S. PATENT DOCUMENTS

| | | | |
|---|---|---|---|
| 9,245,433 B1 * | 1/2016 | Butler | .................... G08B 13/00 |
| 2013/0247117 A1 * | 9/2013 | Yamada | ................ H04W 4/029 |
| | | | 340/12.5 |
| 2016/0127404 A1 | 5/2016 | Baxley et al. | |
| 2017/0164145 A1 | 6/2017 | Lipman et al. | |
| 2017/0295193 A1 | 10/2017 | Yang et al. | |

* cited by examiner

*Primary Examiner* — Ted M Wang
(74) *Attorney, Agent, or Firm* — Hoyng Rokh Monegier BV; David P. Owen

(57) ABSTRACT

An internet of things is disclosed, comprising plural SDR receivers and possibly a centralised system, where one or more of the receivers may be mobile. The internet of things thus allows for a very large proportion of RF signals present within a city, for example, to be monitored and analysed for the purpose of identifying, tracking and/or preventing criminal behaviour. The receivers may be equipped with secure SDRs for increased security and privacy and the system preferably includes artificial intelligence using machine learning technology, for increased adaptability among others. The system is flexible due to the programmability of the SDRs.

20 Claims, 6 Drawing Sheets

AUTOMATED SURVEILLANCE SYSTEM

TECHNICAL DOMAIN

The present disclosure relates to the domains of machine-learning and intelligence gathering through signal analysis, especially where radio communication techniques are used to provide interconnectivity between devices. Technology from these domains is described herein in a context of protection against crime.

BACKGROUND

By the simple fact that more people have access to connected devices such as cell phones, computers, connected cars and the like, it follows that criminals too have access to such devices, thus allowing them to exhibit increasingly complex behaviours and even posing significant terrorist threat in some cases. Despite evolving criminal investigation techniques, these complex criminal behaviours make the task of law enforcement agents in fighting against crime increasingly complicated.

The evolving technology however, may also be used by law enforcement agents to render them more efficient at detecting, solving and perhaps even predicting crime. Machine learning and artificial intelligence technology, for example, has been used by law enforcement agencies to help in criminal investigations and in the prevention of crime. Techniques currently used for this generally require access to large data sets in order to produce reliable results.

BRIEF DESCRIPTION OF THE DRAWINGS

The present disclosure will be better understood thanks to the detailed description which follows and the accompanying drawings, which are given as non-limiting examples of the embodiments described, namely.

DETAILED DESCRIPTION

Figure 1:
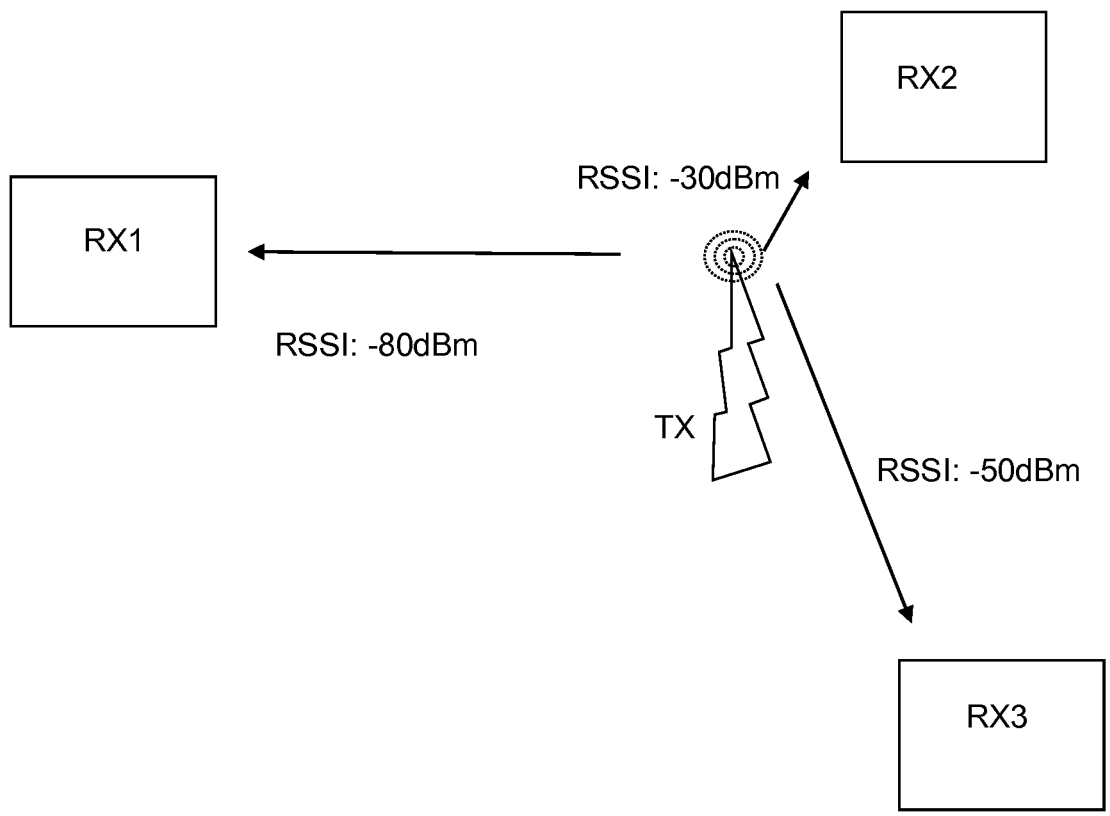
FIG. 1, illustrating how RSSI varies at a receiver depending on the location of a particular RF source.

In order to address problems in the state of the art, there is provided an automated surveillance system, comprising:

one or more radio frequency receivers configured to extract information from a received band of radio frequency signals; and a data analysis system;

the data analysis system being configured to analyse the extracted information;

characterised in that:

the data analysis system is a distributed data analysis system at least partly comprised within the one or more radio frequency receivers; and the one or more radio frequency receivers comprise a software-defined radio circuit configured to perform at least part of said extracting of information from the received band of radio frequencies.

An example of a system as described above is a system comprising a plurality of receivers and a server. The receivers listen to WiFi beacons and each receiver extracts the service set identifier (SSID) information and measures the received signal strength indicator (RSSI). All of the receivers in the system send the RSSI and SSID information, along with their own GPS coordinates to the server, and the server uses this information to compute the locations of all of the WiFi access points and maps them geographically. This is an example of data analysis in the context of the embodiments described herein.

According to another example, data analysis may include automated analytical model building. Systems according to certain embodiments may therefore learn from data, identify patterns and make decisions without human intervention. In these embodiments it may be said that the data analysis includes machine learning.

Like most people, criminals have access to more and more connected devices such as cell phones, computers, connected cars and the like. When such devices are connected together to form a network, this is sometimes referred to as a network of things or an Internet of Things IoT, especially when such interconnectivity is provided via the Internet. Devices which are suitable for use in an Internet of Things generally use wireless communication and therefore use signals in a radio spectrum. Consequently, such signals may be observed by anyone having a suitable adapted radio receiver placed within the range of said wireless radio signals. Any number of different source devices within the range may contribute to the observed spectrum. According to embodiments described herein, data extracted from signals in an observed spectrum may allow for a particular source to be identified. Furthermore, if a radio signal, transmitted by a particular device or source, may be observed by a plurality of receivers within range of the signal, then it is possible to pinpoint the location of the transmitting device in a precise manner. Geolocation, trilateration, multilateration and/or triangulation techniques may be used for this.

More generally, devices which are capable of wireless communication are detectable by the radio signals they emit. Depending on the device, it may communicate according to one or other wireless protocol. For example, a smart phone may communicate using CDMA, GSM or UMTS and/or a WiFi protocol and/or a Bluetooth protocol. Other devices may use protocols such as LoRa, NB-IoT or Zigbee, for example. Within a given area, such as in a city, there may be hundreds of thousands of portable communications devices and other IoT devices capable of communicating via radio frequency signals according to various different protocols.

Figure 2:
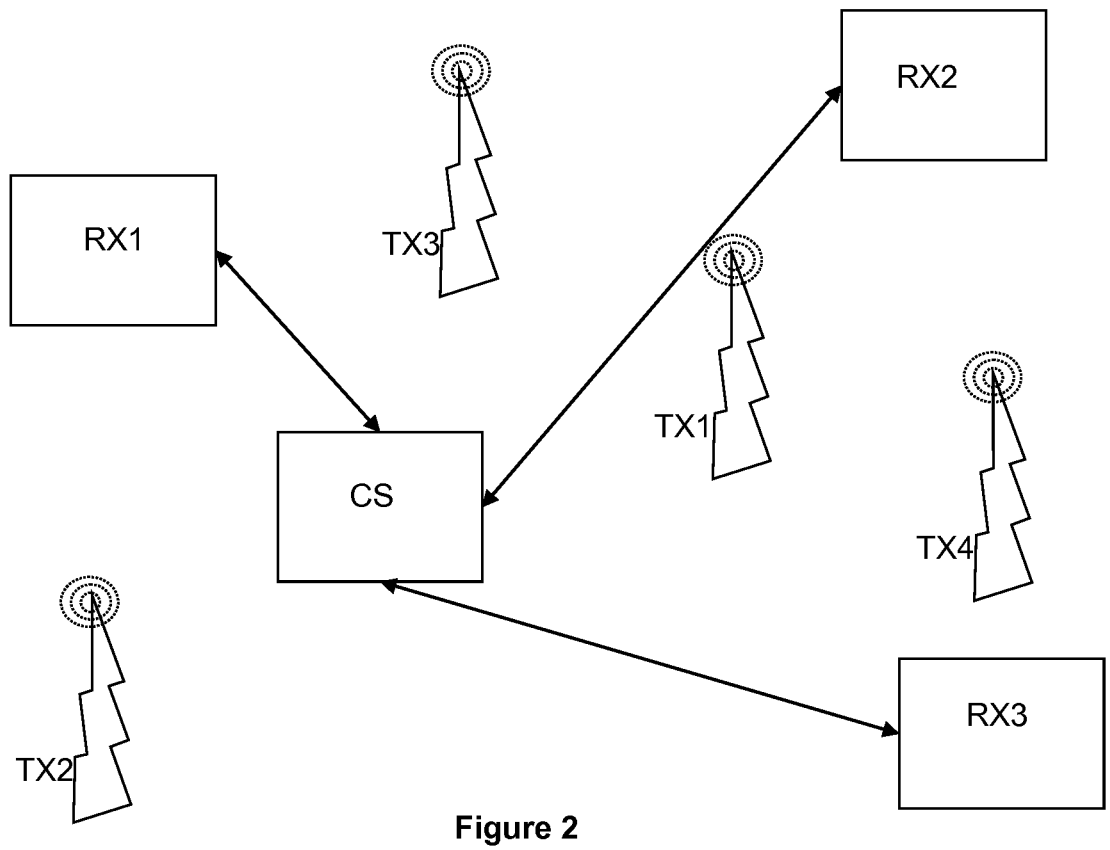
FIG. 2, illustrating how a system comprising a plurality of radio frequency receivers may be configured, with a central system, to provide location information concerning a plurality of radio frequency sources.

A radio reception device configured to receive a band of radio frequencies within which one or more radio frequency transmitting devices transmit may be adapted, according to an embodiment, to observe an entire band of frequencies and thereby to log the existence of a large number of transmitting devices within range. FIG. 1 shows a waterfall representation of frequencies which may be received from radio frequency signal sources operating according to the Global System for Mobile Communication standard GSM. FIG. 2 shows a waterfall representation of signals observable at around 2.4 GHz, typically emitted by radio frequency sources operating in the Industrial, Scientific and Medical band ISM such as WiFi or Bluetooth protocols.

According to an embodiment, software-defined radio SDR technology is used to allow for large bands of received radio signals to be efficiently analysed in software. Furthermore, the fact that SDR technology is used, allows for flexibility in setting the different frequencies to be tuned to and different bandwidths to be observed as well as how the signals are to be demodulated in order to extract information from them and how to deal with the extracted information according to different protocols. The extracted signals may be analysed to provide information about those signals and their sources.

According to an embodiment, an SDR adapted to perform the capture and analysis of radio frequencies may be deployed in equipment which is mobile: for example, within radio equipment on board an automobile or within a smartphone capable of being transported to different places. Suitably equipped SDRs may also be deployed with smart city appliances distributed throughout an area of a city for example. Alternatively, or in addition, static positions may also be exploited, for example by installing SDR RF capturing equipment in cell phone towers, since these towers tend to be strategically located by design. Consequently, it is possible to arrange for a number of these SDR circuits to observe almost all radio signals in a city for example. By arranging for a plurality of these SDRs to work together and/or to report to a central analysis centre or a centralised database, it is possible to locate and/or track sources of particular radio frequency signals within the observed spectrums. FIG. 1 shows an example of how geolocation may be performed using RSSI from a plurality of receivers. Such geolocation techniques may be achieved in systems in which an embodiment described herein is deployed. In FIG. 1, the different strengths of signals received from the radio signal source (TX) at the different receivers (RX1, RX2, RX3) allows for the location of the source (TX) to be estimated. FIG. 1 only shows one transmitter, but it is to be understood that any number of transmitters is also possible. According to other embodiments, triangulation, trilateration or multilateration are among some of the techniques which may be employed to locate and/or track radio frequency sources. Trilateration may be considered to be a particular case of multilateration, trilateration using three measurement stations while multilateration may use more than three. Multilateration measurement techniques for locating transmitters usually involve measuring time difference on arrival (TDOA).

Information which may be useful for locating different sources of radio signals may be obtained, for example, by analysing received signal strength indicators RSSI of the signals received from the different sources. According to an embodiment, one or more receivers may extract information from received radio signals to allow more detailed analysis involving the demodulation of the signals to extract information according to a logical protocol of the signal data. In this manner it is possible to extract information which can identify a source. Indeed, by demodulating a radio signal and extracting actual data bits that are being transferred it is possible to uniquely identify transmitting devices. Since certain bands of the radio spectrum are usually assigned to a given usage, this helps determine the potential modulation used and give a hint as to how the demodulation should be done. Consequently, it is possible to learn which type of modulation is being used and the SDR can be adapted to properly demodulate and decode the signals in order to access the actual data being sent. Many protocols require that the source of a signal include a unique identifying parameter UID which can be used to positively identify a chip of the transmitting device be included in the signal being transmitted. Embodiments described herein can therefore be adapted to decode such information and therefore reliably identify individual transmitting devices over time.

Either of FIG. 1 or 2 may be taken to represent systems in which an embodiment may be deployed. In the system of FIG. 1 only one receiver is shown, however in a preferable embodiment many receivers are possible. Each receiver comprises a software-defined radio chip, configured to receive bands of radio frequencies. The SDRs are programmable so that different central frequencies and bandwidths of signals may be chosen to be received as required. The SDRs are further configured to extract information from the received radio frequency signals. Each of the receivers also includes a data analysis system to analyse the extracted information.

According to an embodiment, the receivers may be connected together in a network. This allows for them to share information or to otherwise communicate together. Consequently, according to an embodiment, the data analysis system is a combination of systems from a plurality of receivers and the central system. In FIG. 2, there is a central system including a centralised database for receiving all or part of the information extracted from the receivers. According to one embodiment the central system includes a data analysis system to analyse the information from the receivers. According to another embodiment, the receivers may be connected together in a network, with the information being analysed by the receivers and then collected and aggregated by the central system. In other embodiments, the receivers may be said generally to provide partial analysis capability, with the central server providing further analysis over and above a simple aggregation function.

Embodiments disclosed herein may be employed for the task of tracking transmitters. In the case of tracking of criminal activity, advantage is taken of the fact that persons involved in criminal activity may carry or be otherwise associated with equipment which transmits radio frequency signals. The appearance and/or disappearance of radio signals, as well as the geographical movements the sources of radio signals is therefore a source of information that can be useful for tracking criminals. Furthermore, by analysing information extracted from such signals, especially with the use of a machine learning system for the data analysis, it is possible to classify what is normal, what is suspect and what is known to be criminal activity. By using the data extracted for two or more receivers, the central system is able to determine a geographical location of one source of at least part of the band of radio frequency signal. Consequently, not only is it possible to allow law enforcement agencies to detect criminal behaviour but also to predict future possible criminal behaviour. Since the systems disclosed herein may be distributed over many SDRs deployed in many devices in the field, in many locations, each SDR being capable of easily extracting useful information from a lot of radio frequency signals, such systems are convenient for investigating crimes that have either already taken place or that are yet to take place by providing for the tracking of a huge quantity of signals, some of which may be linked to criminal activity.

According to embodiments, the machine learning system may be supervised. Such supervision may be provided by human interaction in order to teach the system to recognise criminal behaviour so that further occurrences of similar behaviour could be detected and tagged as being criminal activity or potential criminal activity. In order to increase efficiency, the system may also be taught about places of interest such as crowded areas, drug dealing areas, etc. Furthermore, such information may be shared between different law enforcement agencies, possibly across different countries, in order to mutually bring the different agencies to a common understanding of what observations may be used to indicate the presence of criminal activity. Embodiments would therefore allow for real-time detection of crimes as well as the prediction of crimes through observed criminal patterns. Law enforcement agents are therefore able to better focus their actions and potentially thwart threats before they even happen.

The following scenarios are examples of those in which embodiments described herein may find use:
  smart phone theft: a particular smart phone is detected. Tracking of the smart phone suggests that an apparent user of the smart phone appears to be running on a sidewalk whereas the centralised database shows that the observed smart phone has never been associated with running. The machine learning system flags this as being unusual and indeed it might indicate that a person other than the owner is running away with the stolen smart phone;
  ATM skimming: spurious signals start appearing at the exact location of an ATM. This might be an indication that a wireless skimmer has been installed in the ATM. Consequently, a system in which an embodiment is deployed may include one or more mobile devices with SDRs on board for receiving RF signals from either mobile or non-mobile sources. This example illustrates that the observation of RF signals emitted by a non-mobile source may also be used to solve or prevent crime;
  drug trafficking: several cell phones transmit data from an area known for drug dealing and stay in that location for extended periods of time. These phones likely belong to the dealers. It is possible to track these dealers when they go mobile, identify new dealing places, identify new dealers, etc.
  murder: a murder is discovered in a specific location. Looking at historical radio signal data around the time of death, it is possible to identify and track the wireless devices that were in close vicinity of the murder when it happened.
  phone-activated bomb: a cell phone that is not moving for a while is detected in a crowded area where there is usually a lot of movement. Through further analysis of historic data, it turns out that this phone came together with another one that quickly left the scene. This might be an indication of a phone-controlled detonator left by a terrorist, especially if this particular phone doesn't have a long history (i.e. a burner phone).

Systems in which an embodiment described herein is deployed provide a very convenient and economical solution to problems related to law enforcement and/or prevention of crime, especially given the fact that software-defined radio circuits are being deployed in increasing numbers of consumer equipment. By configuring one or more of such software-defined radios to perform as described herein, a cheap and convenient solution is readily provided. As well as for law enforcement agencies, such systems may be deployed for use by military and/or intelligence agencies.

According to an embodiment, a cognitive radio system may be realised. In this case the SDRs in the system may receive information, either from each other or from the central system to provide them with further awareness. For example, communications between SDRs and/or the central system may be improved through the selection of a less-crowded communication frequency when information regarding the existence of such a frequency may be provided to them. Re-tuning to the new frequency is then readily achievable by the software-defined radios. Since the system has to deal with very large volumes of data the ability to adapt in this manner, to obtain the best throughput, is an advantage.

In practical use, there are privacy concerns related to the systems described herein and therefore certain security measures may need to be taken. According to some embodiments, each receiver has its own view of a global radio landscape. Instead of sending information relating to the complete spectrum that it observes to the central system, each receiver may be adapted to perform a pre-analysis of its extracted information. Consequently, by having each receiver send only the result of the pre-analysis to the central system, important economy of bandwidth may be achieved. Software-defined radio circuits allow for each receiver to have the necessary processing power to provide such pre-analysis of its observed spectrum. Each receiver is configured to extract the information from its observed spectrum according to specific rules, analyse the extracted information and create useful related meta-data to be sent to the central system or server. These rules and the way in which the extracted information is processed are rather sensitive as they could contain details about the kind of information that is extracted. As a further protection, the path from the SDR to the server may therefore be protected.

Figure 3:
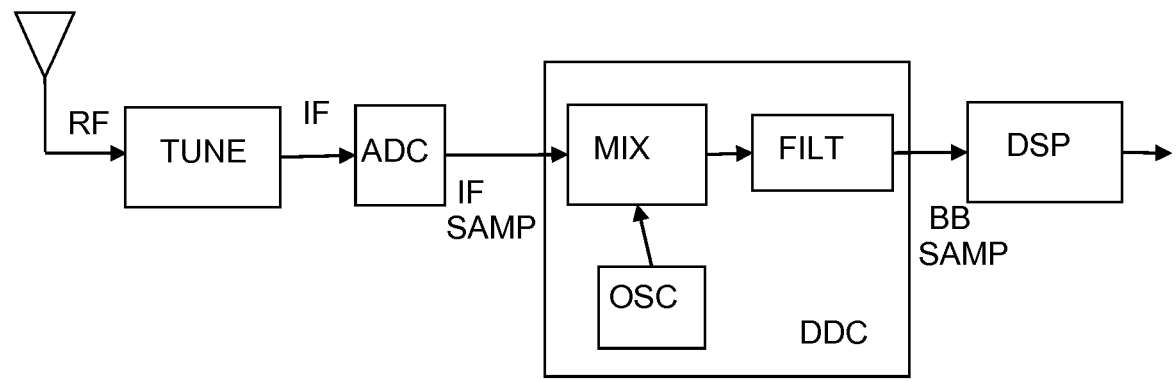
FIG. 3, showing a schematic diagram of a known software-defined radio system.

According to an embodiment, the SDR uses a field-programmable gate array FPGA in order to provide flexibility and speed. Once the analogue to digital ND conversion of the radio signals is done, this allows for the implementation of the various signal processing operations in a single chip. An example of a SDR is shown in FIG. 3.

To address the security and privacy concerns, according to some embodiments, the SDRs deployed in the system are secure SDR chips as disclosed in more detail below.

It can be seen then that the interconnectivity of plural SDR receivers and possibly a centralised system, where one or more of the receivers is mobile, allows for a very large proportion of RF signals present within a city, for example, to be monitored and analysed for the purpose of identifying, tracking and/or preventing criminal behaviour. The receivers may be equipped with secure SDRs for increased security and the system preferably includes artificial intelligence using machine learning technology, for increased adaptability among others. The system is flexible due to the programmability of the SDRs. Such a system may be referred to as an Internet of Things IoT and may be used to provide automated surveillance of certain activities via analysis of large amounts of data extracted from bands of radio frequency signals.

In known software-defined radios, there is usually a tuner for selecting frequencies at the front end. The selected radio frequency is usually shifted down to provide an intermediate frequency. This would be followed by an analogue to digital converter to convert the intermediate frequency signal to the digital domain. All of these stages are realised in specialised hardware. Furthermore, specialised digital hardware is then used to provide mixing, using a hardware-implemented local oscillator, and filtering to provide base-band samples. These functions may be collectively referred to as digital down-conversion. Any further processing of the base-band samples may be done in software, generally using a digital signal processor for performing signal processing, including filtering and noise reduction and the like. In a software-defined radio, a re-configurable hardware programmable device is used to perform all of the digital down-conversion functions. Consequently, both the digital signal processing of the base-band samples and the digital down-conversion can be performed in software.

FIG. 3 is a schematic diagram showing a known software-defined radio system. The selected TUNE radio frequency input signal RF is shifted to provide an analogue intermediate frequency signal IF. The IF signal is then converted from the analogue domain to the digital domain using an ND converter ADC, thereby providing digital IF samples IF SAMP. In order to facilitate subsequent processing, digital IF samples are generally represented in the form of I/Q data, since this is a convenient format for performing the various required processing operations in software. As shown in FIG. 3, various functions, which would have been performed in hardware, are now performed in software in the SDR system. These functions together may be described as digital down-converting DDC, which serves to provide digital baseband samples BB SAMP. Such functions, implemented in software and executed on programmable hardware devices in the SDR, are shown in FIG. 3 and include digital mixing of signals MIX with the aid of a digital local oscillator OSC, and low-pass filtering FILT. General digital signal processing functions DSP may then be performed on the digital baseband samples BB SAMP.

According to an embodiment, in order to maintain an optimum low SWR, especially during transmission, the SDR may be used to dynamically tune the frequency and radiation pattern at the antenna.

Figure 4:
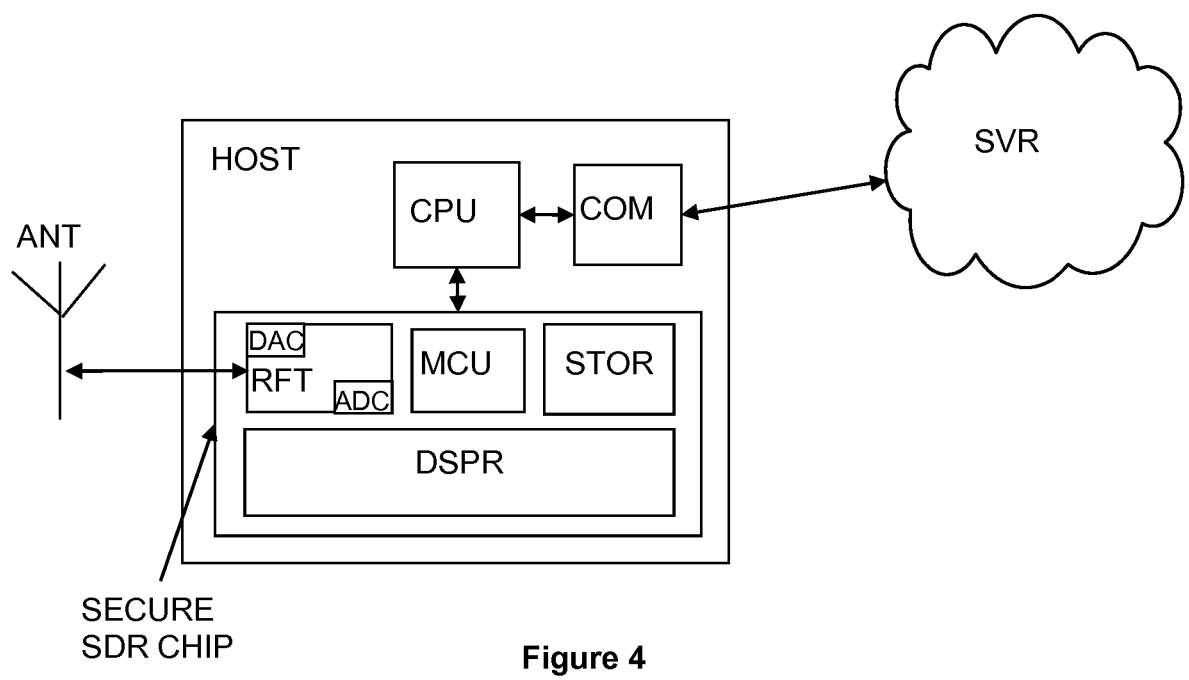
FIG. 4, representing an embodiment of a secure software-defined radio chip embedded in a host device, as described herein.

An embodiment of a secure software-defined radio chip is shown in FIG. 4. The secure SDR chip is shown embedded in a host device. According to the embodiment, a self-contained secure chip is provided, which includes all of the analogue and digital blocks, the analogue part including the radio frequency transceiver RFT along with any required signal conversion units such as an analogue to digital converter ADC, and the digital part including the microcontroller unit MCU, storage area STOR for the secure SDR chip and digital signal processing capability including a reconfigurable hardware programmable circuit RHPC and a digital signal processing unit DSP. The combination of RHPC and DSP of FIG. 4 may be referred to as a digital signal processor for performing SDR functions DSPR, including secure functions. In a preferred embodiment the RHPC part would deal with the digital down-conversion of the IF samples to provide baseband samples and the DSP part would deal with the base-band processing steps of the SDR chip. Digital down-conversion may include mixing and filtering, the mixing using a local oscillator. The host device comprises the secure SDR chip and a main processing unit CPU. According to one variation, the SDR is configured to communicate directly with a server, such as a cloud server. According to another variation, the SDR may include a communications interface COM for communicating with the server. The various components of the secure SDR chip will be described below.

The microcontroller unit MCU is preferably a secure microcontroller unit in order to ensure the security of the secure SDR chip as a whole. Such security may be provided, for example, by performing key management functions, cryptographic operations etc. The secure microcontroller controls or otherwise drives the various radio components. Decisions such as which radio frequency to tune to, how much bandwidth needs to be received/sent, how to modulate/demodulate signals, how to deal with the received data, etc., may be taken by the MCU. The MCU may also handle secure communications with the host device and/or a cloud server via the communications interface COM.

The storage unit STOR serves as a storage area, local to the secure SDR chip, for data or meta-data extracted from the radio signal. Wideband signals generally require a significant amount of space to be stored and so the secure SDR chip should preferably have local storage means. The storage may be in the form of an I/O buffer, preferably implemented as random access memory RAM since high speed operation is generally required;

The radio frequency transceiver RFT is the main analog part of the SDR. The radio frequency transceiver receives, and may transmit, radio signals and may use an analogue to digital converter ADC in order to allow analogue radio frequency signals received via the antenna to be useable in the digital domain of the MCU and the secure software-defined radio chip's radio digital signal processor, which can be seen as a combination of a reconfigurable hardware programmable circuit and a DSP. The radio frequency transceiver may also use a digital to analogue converter DAC to convert signals from the digital domain back to the analogue domain for transmission via the antenna. The antenna used by the radio frequency transceiver RFT preferably matches the required frequencies. While decent reception could be achieved using a wideband antenna, transmitting requires a specific antenna or specific antennae in order to maintain a low standing wave ratio SWR. If the SDR is designed to work with signals having high enough frequencies, such as in the ultra-high frequency range UHF including those frequencies ranging between UHF 300 MHz and 3 GHz or in the super-high frequency range SHF including those frequencies ranging between 3 GHz and 30 GHz, then it may be possible to embed the corresponding antenna on a printed circuit board PCB on which the host device is deployed.

Digital processing capability for the secure SDR chip is provided by the block named DSPR in FIG. 4. DSPR may include a standard digital signal processor DSP for performing standard DSP functions plus a reconfigurable hardware programmable logic circuit RHPC, such as an FPGA, to provide digital signal processing functions which are programmable in order to at least provide the necessary flexibility in the DSPR. The RHPC contributes towards the required flexibility to be achieved, where the radio has to be able to work at different radio frequencies and for different radio protocols, or according to different user preferences or operating environment conditions. Thus, the functions of the radio are easily alterable by software re-programming to reconfigure the programmable logic circuitry. Such altering of the functions may also include software programming to program the DSP. It will also be shown that the reconfigurable hardware programmable logic circuit, according to embodiments described herein, contributes towards the overall security of the secure software-defined radio chip. The DSPR unit may be considered to be the processor of the SDR. The DSPR may be described as a combination of a standard DSP and the reconfigurable hardware programmable logic circuit RHPC. The firmware for this processor may be loaded by the MCU. The firmware may be modified depending on the target application. The DSP may be said to be the software programmable part of the software-defined radio chip's processor, while the reconfigurable hardware programmable logic circuit may be said to be the hardware programmable part of the processor.

According to an embodiment, the reconfigurable hardware programmable logic circuit includes logic required for processing the I/Q digital IF samples coming from and going to the radio frequency transceiver. This part of the processing represents the intensive processing that would normally not be possible by a standard microcontroller or processor. Such processing includes functions like modulation, demodulation, digital down conversion, fast Fourier transforms FFT, radio signal detection, etc.

Figure 5:
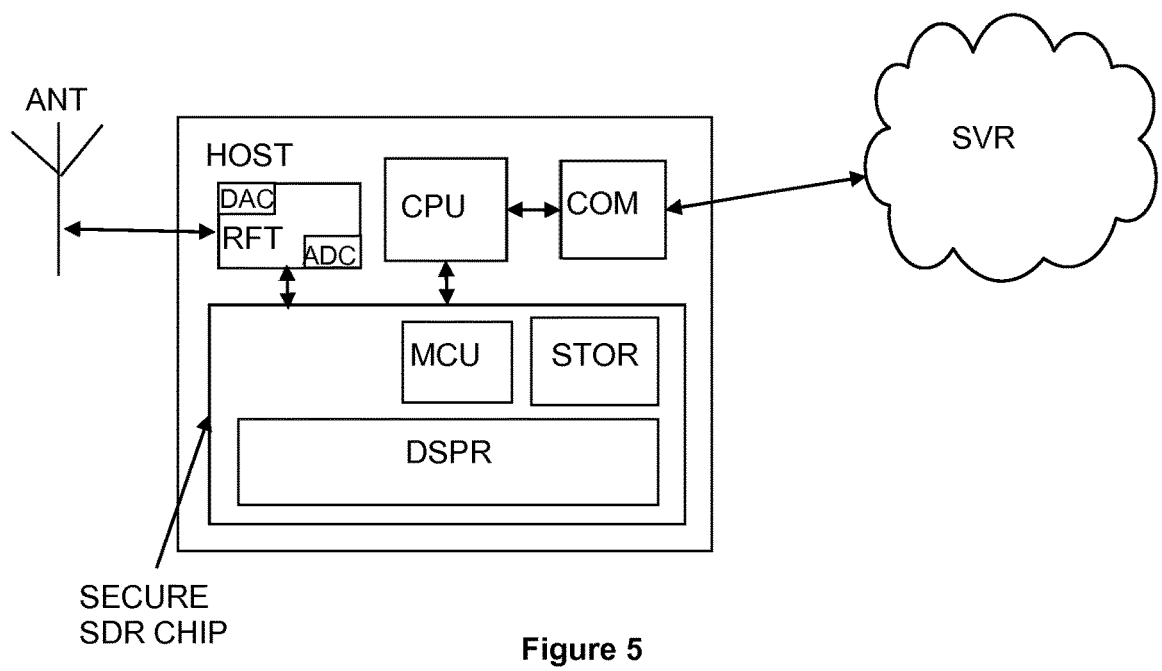
FIG. 5, illustrating another embodiment of a secure software-defined radio chip embedded in a host device, as described herein.

According to another embodiment, the analogue radio components, such as the RF transceiver and the analogue to digital and digital to analogue converters, may remain outside of the secure SDR chip. This is illustrated in FIG. 5. Cost advantages are achievable by doing this because chip size can be reduced. Further advantages are to be possible since different design options can be exploited when the analogue components do not have to be on the same chip as the digital processing functions. This embodiment has a limited impact on the security of the system because the main components of the system remain within the secure zone. The main drawbacks from this approach are that it is conceivable that an attacker could discover which frequencies are being tuned to, thus allowing him or her to get the I/Q data being received or transmitted over the RF. This is known as an intelligence leak.

According to embodiments described herein, the secure SDR chip may be used to pre-analyse a chunk of an incoming RF spectrum. Pre-analysing an incoming signal or spectrum may be described as extracting specific data and collecting certain meta-data from the incoming RF signal. Pre-analysing the incoming signal is preferred because sending the complete I/Q data representative of the incoming signal to a server for remote analysis of the signal would involve transmitting a large amount of data, thus requiring large amounts of network bandwidth. This remains true even after digital down-conversion of the signal. Consequently, according to embodiments, the RF data is demodulated locally, within the re-configurable logic circuit, and processed at least to extract certain specific data related to the signal and to collect certain meta-data related to the signal. These are the results of the pre-analysis. The results of the pre-analysis are then sent to the server for further processing. In this manner the amount of bandwidth required is significantly reduced.

In use, embodiments of a secure SDR chip described herein provide, among others, the following benefits:
  mutual authentication between the secure chip and the server;
  confidentiality and integrity of the data and/or meta-data that transits between the secure chip and the server;
  confidentiality of the processing rules, including DSP functions which the secure chip is required to perform;
  the main CPU of the host, which cannot be fully trusted, never gets access to the data or meta-data;

In order to provide end-to-end security, it is desirable for the server also to feature hardware security, especially if the network is not air-gapped. An air-gapped network would be one which does not include the internet, for example. It is also worth noting that although the main CPU cannot generally be fully trusted, in certain cases the main CPU may still be allowed to perform certain RF operations which do not compromise security.

A system in which an embodiment may be deployed may include a server and one or more connected devices each comprising a software defined radio (SDR), as described above, and may further include an interface through which a user can provide inputs to the system and through which the system may provide outputs to the user. The system is configured to provide data analysis capability. In some embodiments the data analysis may have machine learning capabilities. In embodiments where the data analysis system does not teach itself, the interface allows the user to provide inputs to teach the system certain behaviours. The system may then compare observed behaviours, extracted from the signals received by the SDRs and to provide an alert to the user via the interface should an observed behavior be significantly different from the taught behavior. Alternatively, the user may teach the system a particular behavior that the system then flag up when such a behavior occurs during use. For example, the user could teach the system certain "rogue" behaviours to be flagged during operation. Where the system is configured to teach itself and to adapt according to behaviours observed through large amounts of radio signals, the system may automatically alert the user of a possible anomaly via the interface.

In embodiments which include machine learning features, the system may predict certain behaviours and provide alerts accordingly. The system may use a combination of automatic detection and user input. For example, a user may input tags corresponding to geographic locations of places of interest, such as ATM machines for example, or known locations where illicit dealings are suspected to have taken place. The system may generate alerts whenever particular behaviours are observed corresponding to the tagged locations. The system may also learn from the observed behaviours and predict a time and/or a location of significant activity of interest and provide an alert via the interface. As well as observed behaviours, the system may also take into consideration historical behaviours which may be stored in a database of historical behaviours.

The following is a description of how to implement a flexible, or otherwise programmable, cryptographic device with associated configuration logic, which may be deployed in a DSPR according to an embodiment described herein. Any of the techniques and methods described here may be used in order to realise a secure reconfigurable hardware programmable logic circuit for a secure SDR chip, whose functionality is reprogrammable after its manufacture, for use in any of the embodiments described above. For example, the reconfigurable hardware programmable part of the RHPC/DSP combination used as a secure software-defined radio signal processor DSPR, in addition to being reprogrammable in order to provide flexible radio processing characteristics described above, may also be programmable to provide the security to the chip. Such techniques for programming the reconfigurable hardware programmable logic circuit to provide security are described below. According to one embodiment of the invention, at least one of the software-defined radio circuits is monolithic secure circuit Secure cryptographic devices deployed as part of embodiments described herein, may be based on a root of trust, preferably a hardware root of trust. According to an embodiment, a root of trust and a key ladder may be used in combination. A root of trust may be created by generating a particular key, for example during manufacturing of the secure software-defined radio chip, and securely storing the particular key in the chip. A convenient place for this may be a storage unit of the chip for example, as long as it is stored in a secure manner. Ideally, the root key may be stored in a one-time programmable memory OTP of the chip. This key may be referred to as a root key. Alternatively, in order to avoid having to load or otherwise initialise a key at personalization time, the root key may be generated using a physically un-clonable function PUF. PUF and OTP both provide a good guarantee that the root key cannot be altered.

The root key may be used to generate other keys of the key ladder using a key derivation function or algorithm, for example. Other keys may be, for example, a key for validating or otherwise authenticating configuration data, analysis parameters or processing rules, or signature keys, preferably as part of a private-public key pair of an asymmetric encryption scheme. Thus, it is possible to perform a one-way function, such as a hash function, on the content or parts of the content of the reconfigurable hardware programmable logic circuit. Furthermore, it is possible to get a signed hash. Consequently, it is possible for the server in a system to authenticate the secure software-defined radio chip and vice versa. Thanks to the root of trust, software being loaded to the reconfigurable hardware programmable logic circuit may be authenticated, rules, commands, instructions and data going in and out of the chip may be authenticated, preferably by verifying signatures.

According to aspects of an embodiment, a method of programming a reconfigurable programmable device is provided, comprising: acquiring configuration data, loading the configuration data onto the programmable device, processing at least a portion of the configuration data through a one-way function, for example, to form or generate processed configuration data and configuring at least one configurable module of the programmable device using the processed configuration data from the processing step. This allows post-manufacture programming of the at least one configurable module in a secure manner, and hence design and fabrication of the programmable device is simplified and less costly whilst maintaining security. In some embodiments, the one-way function comprises a hash function which may be a cryptographic hash function.

In some embodiments, the loading step further comprises decrypting the configuration data, and optionally, the loading step further comprises verifying the authenticity and/or integrity of the configuration data by way of an asymmetric key or a symmetric key. This provides security of the configuration data.

In some embodiments, the loading step comprises loading the configuration data onto a configuration module of the programmable device. The decryption and/or the verification may be carried out by the configuration module.

In some embodiments, the configuring step comprises a least one of initialising the programmable device, configuring a configurable module of the programmable device, and configuring an interconnection between modules of the programmable device wherein the modules may be configurable or non-configurable.

In some aspects, a programmable device is arranged to carry out any of the methods as described herein. The programmable device may comprise a one-way function and at least one configurable module. The one-way function may comprise a hash function which may be a cryptographic hash function. In some embodiments, the programmable device comprises a configuration module and/or a processing module. The programmable device may comprise an FPGA, PLD, CPLD or an anti-fuse device, for example.

In some embodiments, the at least one configurable module comprises a cryptographic module. In some embodiments, the cryptographic module comprises at least one of a substitution box module, a substitution table module, a bit permutation module, a byte permutation module, or a matrix multiplication module. In some embodiments, the cryptographic module comprises a hardener for a true random number generator or a physically un-cloneable function, 'PUF'.

In some embodiments, the at least one configurable module comprises a programmable state-machine. The programmable device may comprise a secure element. The programmable device may be deployed within any connected device.

Figure 6:
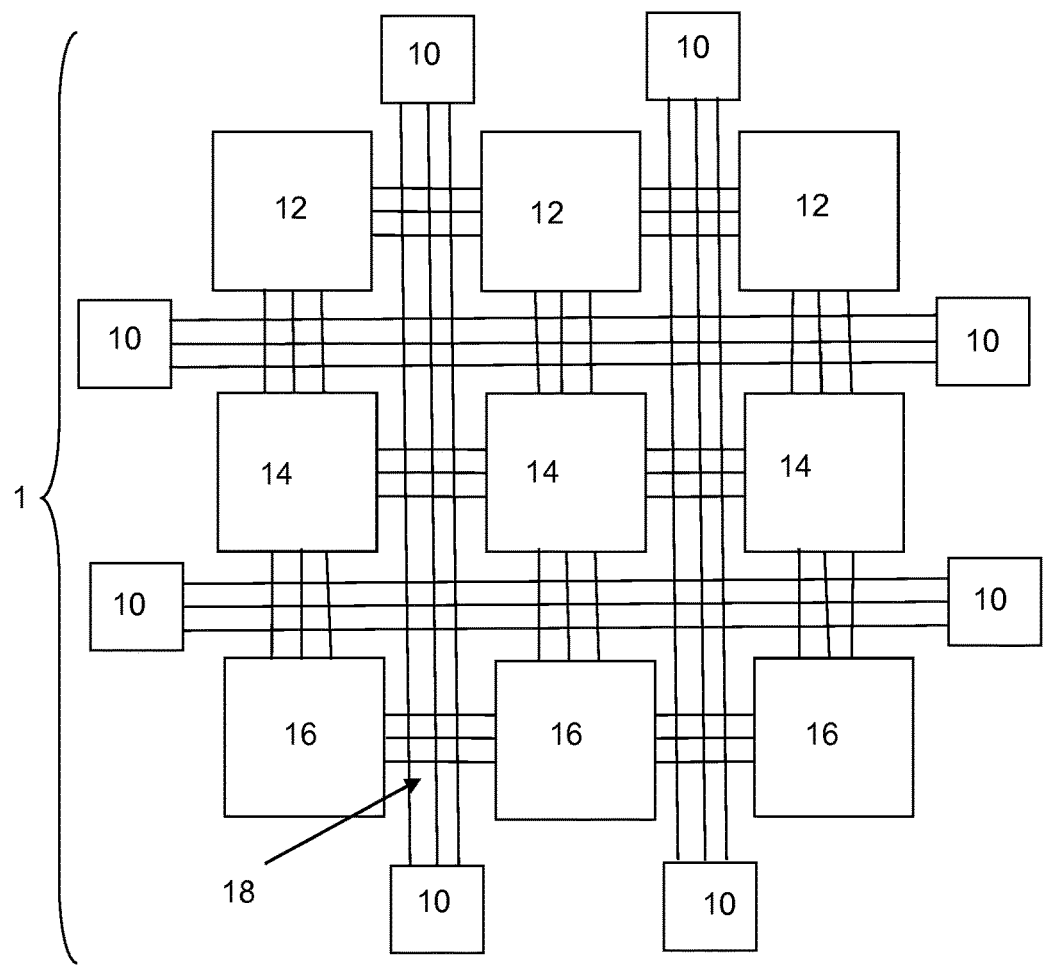
FIG. 6, showing a reconfigurable hardware programmable logic circuit comprising cryptographic modules.

FIG. 6 illustrates a programmable device 1. Examples of programmable devices include FPGA, PLD, CPLD and anti-fuse devices among others, and may also be referred to as reconfigurable hardware programmable logic circuits. The reconfigurable hardware programmable logic circuit of FIG. 6 comprises at least one input/output module, or IO module, 10 for providing inputs and outputs to the other modules of the reconfigurable hardware programmable logic circuit, and one or more cryptographic modules comprising one or more of a substitution box/substitution list module 12, a bit/byte permutation module 14 and a matrix multiplication module 16 as would be understood by the skilled person. An interconnection network 18 as shown by the vertical and horizontal lines passes between modules of the reconfigurable hardware programmable logic circuit. As would be understood, FIG. 6 is an example. Any combination of 10 modules 10, other modules 12, 14, 16, and interconnection network could be deployed.

Figure 7:
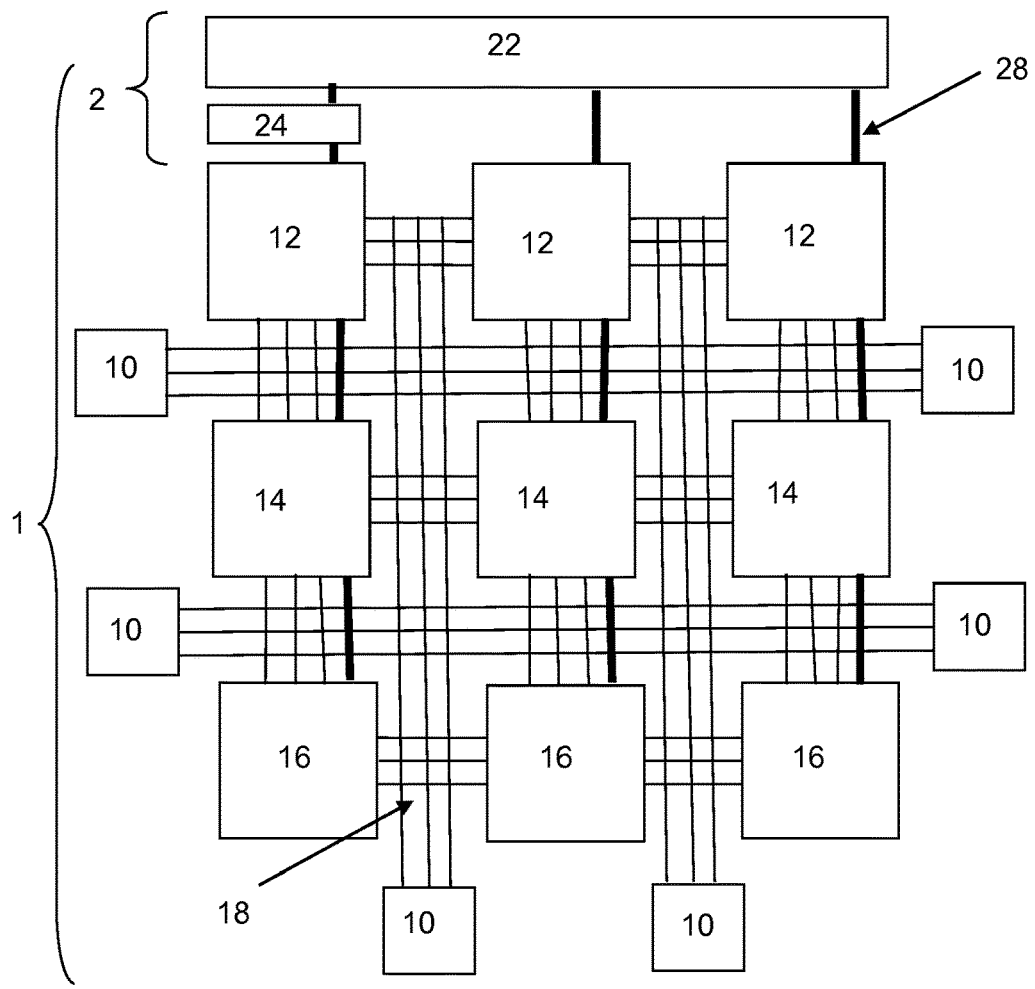
FIG. 7, illustrating a reconfigurable hardware programmable logic circuit which may be deployed in an embodiment described herein.

Turning to FIG. 7, it can be seen that at least one of the 10 modules 10 as shown in FIG. 6 may comprise a decrypt and verify module 22 and a processing module 24 which both may be considered to be part of a configuration module 2. Modules 22 and 24 may be part of the same physical module on the reconfigurable hardware programmable logic circuit 1. As also shown in FIG. 7, interconnection network 18 passes between modules of the reconfigurable hardware programmable logic circuit. At least one of the modules 10, 12, 14, 16, and/or at least a subset 28 of any of the interconnection network 18 as shown by the thicker lines, by way of example, may be configured using configuration module 2. Any of the modules of the reconfigurable hardware programmable logic circuit are capable of being configured by way of the configuration module 2. Hence, the programmable device 1 may be considered to comprise a flexible cryptographic device.

Figure 8:
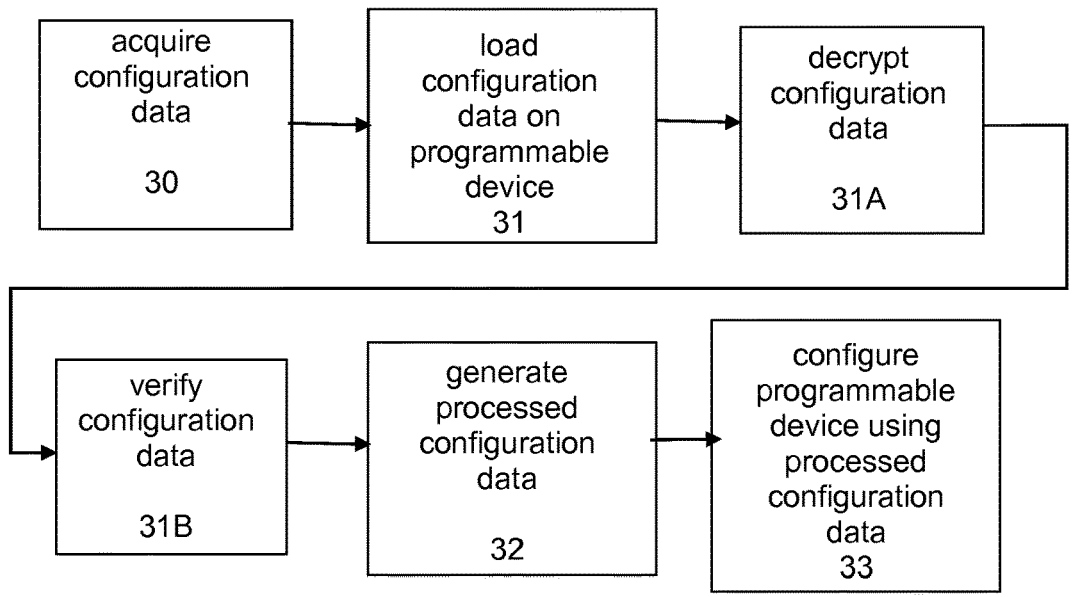
FIG. 8, illustrating a method which may be used in an embodiment.

With reference to FIG. 8, a method will now be described in which at least one module of the reconfigurable hardware programmable logic circuit 1 may be configured in a secure manner. In a first step 30, configuration data is acquired, and then loaded 31 onto the reconfigurable hardware programmable logic circuit 1 by way of any suitable means available on the reconfigurable hardware programmable logic circuit 1 in question. After loading, the configuration data may reside on a configuration module 2 of device 1. In particular the configuration data may reside in a decrypt and verify module 22. The configuration data may be decrypted 31A by module 22. The authenticity and/or integrity of the configuration data may be verified 31B by module 22 by way of at least one asymmetric or symmetric key or a combination thereof as would be understood. Verification may occur before or after decryption. Authenticity of data is ensured when the data is proven to be from a trusted source. Integrity of data is ensured when it can be proven that the data has neither been modified nor corrupted.

After the optional decryption and verifying, at least a portion of the configuration data is then processed in step 32 by processing module 24 to generate processed configuration data. Processing module 24 comprises a one-way function that is operable on the configuration data to provide the processed configuration data. The one-way function is a function whereby it is straight forward to compute the output given the input, but given an output, it is difficult to compute the input. That is to say that it is difficult to compute the inverse function of the one-way function, and preferably, the inverse function cannot be computed.

Processing step 32 may be carried out before or after any decryption and/or verification of steps 31A and 31B.

At step 33, at least one configurable module 10, 12, 14, 16 of reconfigurable hardware programmable logic circuit 1 is configured using the processed configuration data. The configurable module may comprise a cryptographic module such as at least one of a substitution box module, a substitution table module, a bit permutation module, a byte permutation module, or a matrix multiplication module. The configurable module may also comprise a hardener for a true random number generator or a physically un-clonable function, 'PUF' and/or a flexible state-machine, or any portion of the interconnection network—see 28 of FIG. 7.

Configuring by way of the processed configuration data may comprise at least one of:
  initialising the reconfigurable hardware programmable logic circuit 1, whereby internal building blocks, for example flip-flops, of one or more configurable modules of the reconfigurable hardware programmable logic circuit 1 are initialised.
  configuring a configurable module of the reconfigurable hardware programmable logic circuit, for example configuration of cryptographic modules such as substitution boxes, bit permutations, or flexible state-machines, or arithmetic operations such as matrix multiplication, multiply or addition, and/or other modules such as linear feedback shift registers.
  configuring an interconnection between modules of the reconfigurable hardware programmable logic circuit. The interconnection between configurable or non-configurable modules of the reconfigurable hardware programmable logic circuit 1 may be configured. This may include making, breaking or joining interconnections between any of the modules of the reconfigurable hardware programmable logic circuit 1.

Additionally, or alternately, configuring may comprise generating elements by the one way function such as a constant value impacting the behaviour of a configurable module such as a cryptographic module by acting as segmentation elements, initialization vectors, pseudo-random permutations, static keys for example. The output of the one way function may also be combined with other configuration elements that are chosen such that the resulting output matches an expected value.

Some modules of the reconfigurable hardware programmable logic circuit 1 may be configured by way of configuration data that has not been processed by processing module 24.

After step 33, the reconfigurable hardware programmable logic circuit 1 is securely configured.

Figure 9:
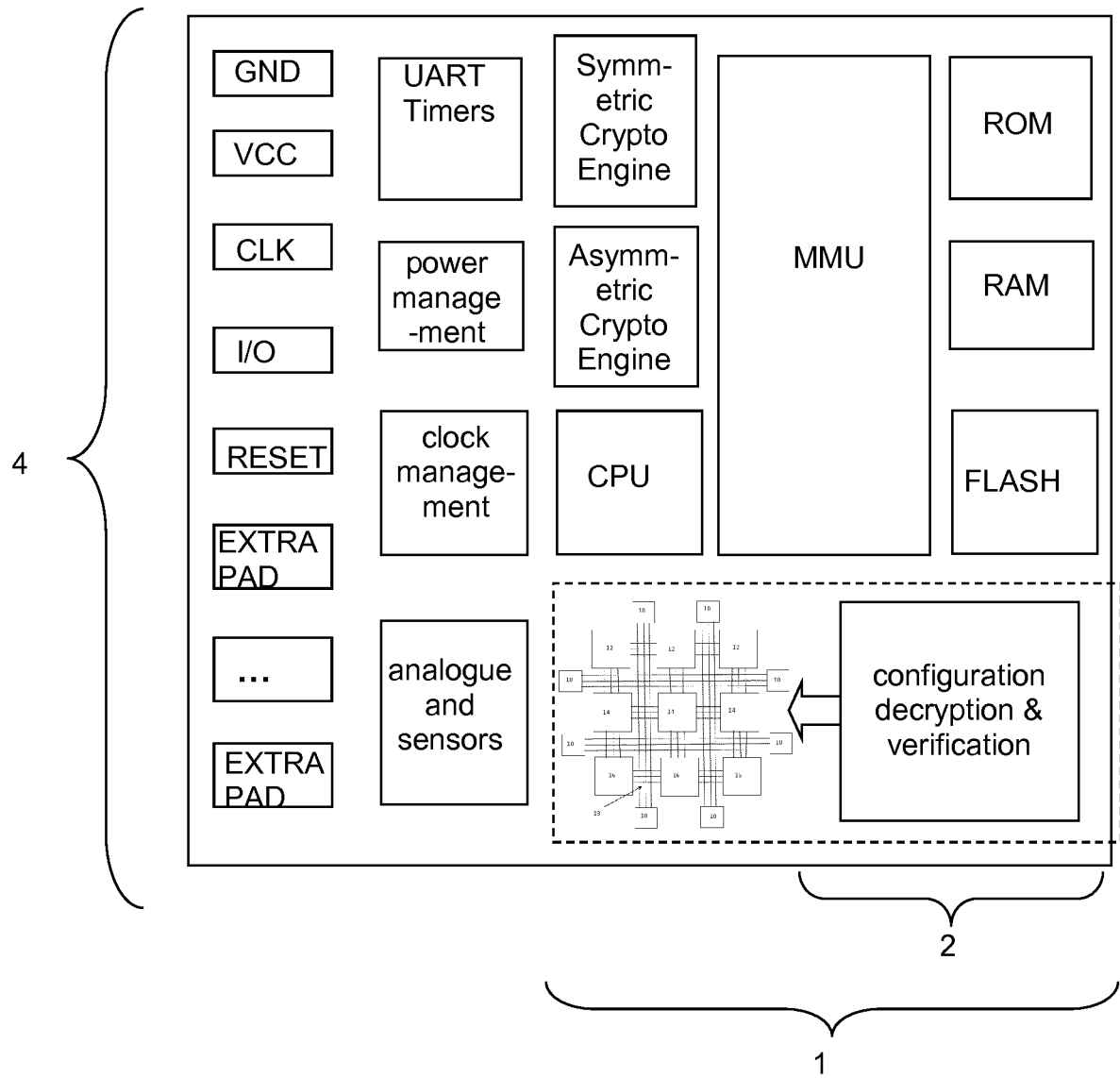
FIG. 9, illustrating a programmable device comprising cryptographic modules.

To put the above concept in context, looking at FIG. 9, FIG. 9 illustrates a reconfigurable hardware programmable logic circuit 1 positioned within a chip for a connected device 4. As would be understood, various components of such a chip are shown in FIG. 9. On the left hand side of the figure are shown the input/output pads, including ground, Vcc, clock, I/O data and extra pads, while various functional components are shown as being present for illustrative purposes only. A memory management unit MMU is shown for interaction with the various onboard memories such as ROM, which is a one-time programmable ROM such as an effuse ROM, RAM and Flash EEPROM, as would be understood. The other modules are not described herein as their function would be known to the skilled person. A subset of the illustrated functional blocks may be present in further examples. Reconfigurable hardware programmable logic circuit 1 may be considered to be a secure element.

Hence, a chip for a connected device 4 comprising the flexible cryptographic device as described herein and as illustrated in FIG. 9 is capable of bespoke and adaptable voice or video encryption, if, for example, the chip resides in a connected device. Further, flexible cryptographic functionality can be provided to internet-of-things devices or system on-chip, SOC embedded devices.

The configurable modules and/or configurable interconnections of reconfigurable hardware programmable logic circuit 1, after undergoing the method described herein, can be tailored for individual vendor needs without undergoing a hardware re-design of the silicon.

Accordingly, a method of deploying a secure module, for example a secure element of a reconfigurable programmable logic circuit is provided. By allowing aspects of the secure module to be programmed post-manufacture, the design and fabrication of the secure module, and hence the device within which it resides is simplified and hence less costly. The post-manufacture programming capability allows aspects of the cryptographic scheme employed by the secure module to be deployed at or before the time of activation of the device containing the secure module. This reduces the burden on bespoke design of silicon such as secure elements which can reduce time to market as well as allowing segmentation of design and security features between different implementations. Further, by holding back some aspects of the design to the implementation stage, a design level attack would not result in knowing all information required to implement the secure element.

This allows flexibility both in design and manufacture of the secure module in that new devices/PCBs comprising a secure element can be distributed that are of a more generic design allowing reduction in manufacturing cost.

As a result, connected device operators/owners can take advantage by way of the fact they may:
  1. tailor their processing rules at will at the point of deployment of the device containing the flexible cryptographic device such as a secure element for example; and/or
  2. change aspects of the processing rules by way of a download to devices post hardware distribution without needing to change hardware in the field.

Further, as would be understood, owing to the action of the one-way function, the configuration data cannot be regenerated in order to enable programming of a blank reconfigurable programmable logic circuit. Even if a desired state of the reconfigurable programmable logic circuit is obtained post-programming, for example by way of a microscopic attack or by scanning all pins of the reconfigurable programmable logic circuit or other device where the reconfigurable programmable logic circuit resides, with all possible input combinations, it is not possible to discover the configuration data required to achieve the particular configuration as the one-way function prevents this knowledge.

An embodiment of the reconfigurable hardware programmable device described herein may be deployed within a connected device. By virtue of the possibilities for configuring the hardware to perform functions required in the digital front end of a software-defined radio chip, and by virtue of the reconfigurable hardware programmable device comprising a flexible cryptographic device, which can be said to be a secure element, a secure software-defined radio chip may thus be deployed in the connected device.

Figure 10:
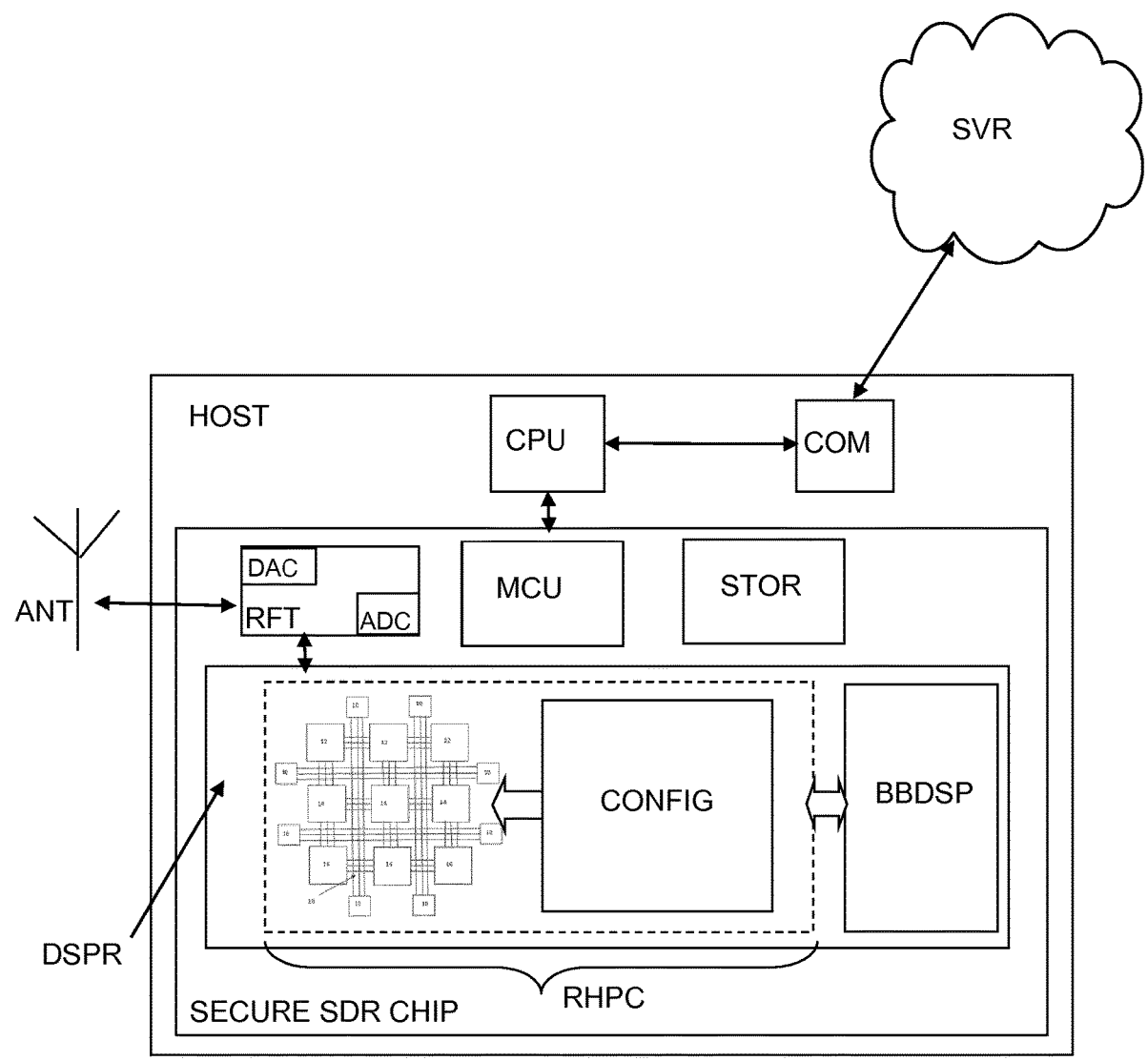
FIG. 10, showing more detail of the embodiment of a secure software-defined radio chip embedded in the host device illustrated in FIG. 4.

FIG. 10 shows an embodiment of a secure software-defined radio chip according to an embodiment, deployed in a connected device. The connected device may be a connected car, for example, having an electronics unit comprising a main processor CPU and, optionally, a communications interface for communicating with a server for example if the chip is not already configured to communicate directly with the server. The secure software-defined radio chip may include analogue hardware such as the radio frequency transceiver and any necessary analogue to digital and digital to analogue modules. According to an alternative embodiment, such analogue modules remain outside of the secure software-defined radio chip and are instead placed in the host device. In either of the embodiments, the secure SDR chip further comprises a microcontroller and some local storage, as described above with respect to FIG. 6. Furthermore, the secure SDR chip comprises a secure digital signal processing function, which may be seen to be a combination of a standard DSP block and a reconfigurable hardware programmable circuit RHPC. In a preferred embodiment the RHPC part would deal with the digital down-conversion of IF samples received from the transceiver's converted output to provide baseband samples and the DSP part would deal with the base-band processing secure steps of the SDR chip.

The RF signal received from the antenna of a software-defined radio chip has first to be translated to a baseband signal for baseband processing by the DSP. This translation may include the functions performed by the transceiver, including tuning and converting from RF to IF, analogue to digital conversion to provide IF samples and mixing and filtering to provide the baseband samples. The part of the radio which performs these functions may be known collectively as the front end. The front end may be made up of an analogue front end, including the transceiver functions and the analogue to digital conversion. The part of the radio which converts the IF samples to baseband samples may be referred to as the digital front end. One embodiment of the secure software-defined radio chip disclosed herein comprises an analogue front end, including the RF transceiver and analogue to digital converter, and a digital front end, comprising modules configured to provide mixing and filtering of intermediate frequency samples provided by the analogue front end and to deliver base-band samples for digital signal processing by the base-band processor DSP. According to another embodiment, the digital front end is not included on the SDR chip, but instead is included in the host device. Preferably, for a radio configured to receive and process ultra-high frequency signals UHF in the range of 300 MHz to 3 GHz or super-high frequency signals SHF in the range of 3 GHz to 30 GHz, the antenna may be embedded on the same printed circuit board PCB as the host device. Consequently, according to an embodiment, a host device comprises an antenna for receiving RF input, a microprocessor, an interface module and a secure SDR chip comprising a microcontroller, local storage, an analogue front end and signal processing, including a digital front end in the form of a reconfigurable hardware programmable logic circuit and a baseband processor. According to another embodiment, a host device comprises an antenna for receiving RF input, a microprocessor, an interface module, an analogue front end and a secure SDR chip comprising a microcontroller, local storage, and signal processing, including a digital front end in the form of a reconfigurable hardware programmable logic circuit and a baseband processor. According to a particular embodiment, the SDR chip may be used to dynamically tune the frequency and the gain for the reception of the radio signal.

The above description provides examples related to the reception path of a radio signal, where such signals are converted to IF, converted to the digital domain, mixed, filtered, among others, to provide baseband samples. It is worth noting, that embodiments described herein may equally comprise the signal chain for up-conversion of baseband samples to IF samples and the digital to analogue conversion to an IF signal then transmission of an RF signal by the transceiver.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. An automated surveillance system, comprising:
one or more radio frequency receivers configured to extract information from a received band of radio frequency signals; and
a data analysis system;
the data analysis system being configured to analyse the extracted information to allow an identifier of at least one source of at least part of the band of radio frequency signals to be determined:
wherein the data analysis system is a distributed data analysis system at least partly comprised within the one or more radio frequency receivers; and
wherein the one or more radio frequency receivers comprise a software-defined radio circuit configured to perform at least part of said extracting of information from the received band of radio frequencies.

2. The system according to claim 1, wherein one or more of the receivers is mobile.

3. The system according to claim 1, wherein at least one of the software-defined radio circuits is monolithic secure circuit.

4. The system according to claim 1, wherein the data analysis system is a machine learning system.

5. The system according to claim 1, wherein the data analysis system is distributed between a central system and the one or more receivers, the central system comprising a centralised database in which to hold at least part of the extracted information for said analysis.

6. The system according to claim 5, the system comprising a plurality of receivers, wherein the analysis of said extracted information includes geographically locating at least one source of at least part of the band of radio frequency signals using two or more receivers.

7. The system according to claim 6, the system further configured to update the analysis of the extracted information at least once in order to provide geographical tracking of at least one of the sources of the at least part of the band of radio frequency signals.

8. The system according to claim 5, wherein the central system and/or the distributed data analysis system is configured to perform behavioural profiling on the extracted information.

9. The system according to claim 8, wherein the behavioural profiling is used to compare behaviours observed through analysis of the extracted information with known behaviours in order to react to a possible behaviour match.

10. The system according to claim 5, wherein the central system and/or the distributed data analysis system is configured to progressively build a database of normal behaviours based on the received signals and to flag an alert when the analysis shows a new behaviour which falls substantially outside of the normal behaviours.

11. An automated surveillance system, comprising:
one or more radio frequency receivers configured to extract information from a received band of radio frequency signals; and
a data analysis system configured to analyse the extracted information,
wherein the data analysis system is a distributed data analysis system that is distributed between a central system and the one or more radio frequency receivers, the central system comprising a centralised database in which to hold at least part of the extracted information for said analysis;
wherein the one or more radio frequency receivers comprise a software-defined radio circuit configured to perform at least part of said extracting of information from the received band of radio frequencies, and
wherein the central system and/or the distributed data analysis system is configured to progressively build a database of normal behaviours based on the received signals and to flag an alert when the analysis shows a new behaviour which falls substantially outside of the normal behaviours.

12. The system according to claim 11, wherein the central system and/or the distributed data analysis system is configured to perform behavioural profiling on the extracted information.

13. The. system according to claim 12, wherein the behavioural profiling is used to compare behaviours observed through analysis of the extracted information with known behaviours in order to react to a possible behaviour match.

14. The system according to claim 11, wherein the data analysis system is a machine learning system.

15. The system according to claim 11, the system comprising a plurality of receivers, wherein the analysis of said extracted information includes geographically locating at least one source of at least part of the band of radio frequency signals using two or more receivers.

16. The system according to claim 15, the system further configured to update the analysis of the extracted information at least once in order to provide geographical tracking of at least one of the sources of the at least part of the band of radio frequency signals.

17. An automated surveillance system, comprising:
one or more radio frequency receivers configured to extract information from a received band of radio frequency signals; and
a data analysis system configured to analyse the extracted information;
wherein the data analysis system is a distributed data analysis system that is distributed between a central system and the one or more radio frequency receivers, the central system comprising a centralised database in which to hold at least part of the extracted information for said analysis; and
wherein the central system and/or the distributed data analysis system is configured to perform behavioural profiling on the extracted information, said behavioural profiling being used to compare behaviours observed through analysis of the extracted information with known behaviours in order to react to a possible behaviour match.

18. The system according to claim 17, wherein the data analysis system is a machine learning system.

19. The system according to claim 17, the system comprising a plurality of receivers, wherein the analysis of said extracted information includes geographically locating at least one source of at least part of the band of radio frequency signals using two or more receivers.

20. The system according to claim 19, the system further configured to update the analysis of the extracted information at least once in order to provide geographical tracking of at least one of the sources of the at least part of the band of radio frequency signals.

* * * * *